ELECTRICAL INDICATOR DEVICE

Original Filed Dec. 22, 1961 2 Sheets-Sheet 1

INVENTOR.
John A. Jackman
BY
H. Gilmer Schumann
AGENT

ELECTRICAL INDICATOR DEVICE

Original Filed Dec. 22, 1961 2 Sheets-Sheet 2

INVENTOR.
John A. Jackman
BY
H. Gibner Lehmann
AGENT

United States Patent Office

Re. 26,349
Reissued Feb. 20, 1968

26,349
ELECTRICAL INDICATOR DEVICE

John A. Jackman, Watertown, Conn., assignor to Lewis Engineering Company, Naugatuck, Conn., a corporation of Connecticut Original No. 3,185,979, dated May 25, 1965, Ser. No. 161,990, Dec. 22, 1961. Application for reissue Mar. 28, 1967, Ser. No. 641,716
6 Claims. (Cl. 340—373)

Matter enclosed in heavy brackets [ ] appears in the original patent but forms no part of this reissue specification; matter printed in italics indicates the additions made by reissue.

*ABSTRACT OF THE DISCLOSURE*

*An electrical indicator comprising a drum which has indicia and which is turnable on a shaft whose one end is secured in a block-like base. The drum carries a permanent magnet disposed with its poles adjacent the drum periphery at one end of the drum. Secured to a pair of opposite sides of the base are parallel magnetic plates, in parallelism with and on opposite sides of the shaft. The plates project beyond the base, and a D.C. magnet coil and metal bore extend between the projecting portions of the plates. The permanent magnet, by its attraction for the pole plates, holds the drum in a given rotative position as a spring would, when the coil is unenergized. However, when the coil is energized the polarity of the pole plates is made such that they repel the permanent magnet, causing it and the drum to rotate to another position on the shaft. The different drum positions cause different indicia to be presented to a viewer.*

This invention relates to electrically operated indicator devices and circuits, and more particularly to time-delay indicator circuits and indicator devices of the type employing an energizable electromagnetic means and a cooperable magnetic armature device, to effect the desired indications.

An object of the invention is to provide a novel and improved current-responsive indicator unit which is especially small and compact whereby it requires a minimum amount of space, said unit at the same time providing relatively large and easily read indications.

Another object of the invention is to provide an improved indicator device or unit as above set forth, which is rugged in construction and reliable in its operation, being particularly trouble-free and not likely to get out of order.

A further object of the invention is to provide a novel indicator device in accordance with the foregoing, which may be easily and quickly adjusted and which will hold a given adjustment in spite of adverse influences, such as shock, vibration and the like.

An additional object of the invention is to provide an improved indicator as outlined, which is extremely simple and involves relatively few parts or components, these further being easily fabricated and assembled.

A feature of the invention resides in the provision of an improved indicator as characterized, wherein those parts of the rotative assembly which are required to be of the greatest weight are located closest to the supporting bearing or support for the shaft, thereby to minimize the adverse effects of rough handling, shock or vibration.

Another object of the invention is to provide, in an "on-off" indicator unit or device as characterized above, simple and effective "flip-flop" means to retain the movable member in either of its two indicating positions.

A further object of the invention is to provide a novel and advantageous time delay indicator circuit for a unit of the type set forth, which is sensitive and reliable in its response, and which enables a simple reset of the unit to be effected.

Another feature of the invention resides in the provision of an improved indicator circuit as above outlined, which is of relatively simple construction capable of being made small and compact so that it requires but little space.

A further feature resides in an indicator circuit so organized as to utilize small and sturdy components which enable the device to be shock and vibration resistant to a marked extent.

Other features and advantages will hereinafter appear.

In the drawings accompanying this specification, similar characters of reference are used to designate like components throughout the several views, in which.

Figure 1:
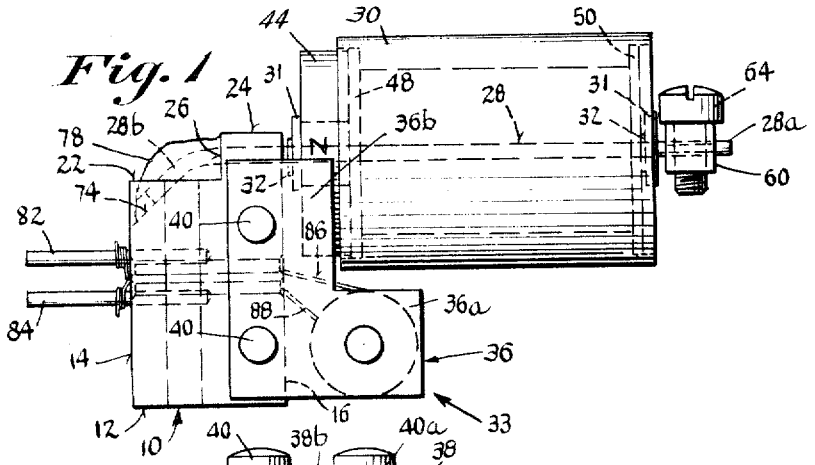
FIG. 1 is a side elevational view of an improved electrical indicator device as provided by the invention.

Referring now especially to FIG. 1, the present improved indicator unit of the invention comprises a right-angled base block 10 of insulating material, the said block being of somewhat rectangular configuration, with a rectangular rear surface 12, rectangular side faces 14 and 16 respectively, opposite flat upper and lower faces 18 and 20, and a stepped or shouldered front portion comprising a major surface 22, a minor surface 24 and a vertical shoulder surface 26. The base block 10 is formed of a synthetic or plastic substance, preferably one having good insulating properties and dimensional stability, good resistance to shock or impact and the like.

Figure 2:
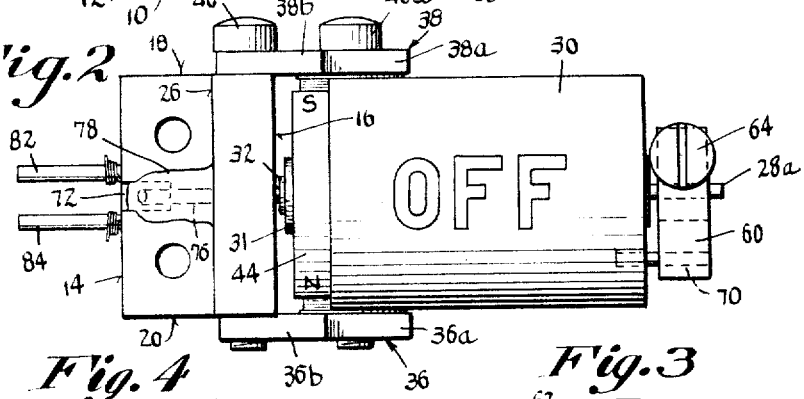
FIG. 2 is a front elevational view of the indicator device of FIG. 1.

The base 10 carries a stationary shaft 28 which projects from the side face 16 of the base and has a free end 28a, as clearly seen in FIG. 2. Turnably carried by the shaft 28 is an indicator drum 30, and disposed adjacent one end of the drum 30 is an electromagnetic assemblage designated generally by the numeral 33 and having an electrical coil 34, the said assemblage, coil and the indicator drum 30 being arranged in a novel manner in accordance with the invention, whereby a relatively small and compact assemblage is had which requires but little space. The said assemblage is further characterized by a unique mounting for the shaft 28 at the stepped front portion of the base block 10, and by a disposition of the magnet coil 34 below and closely spaced with respect to one end of the indicator drum 30, the said coil being arranged broadside to the drum whereby the axes of these components extend at right angles to each other.

The electromagnetic assemblage 33 further comprises poles which are carried by the base block 10 and by which the assemblage is mounted on such block, said poles being in the form of substantially L-shaped flat metal plates or pole pieces 36 and 38. The L-shaped pole plates 36 and 38 are disposed against the opposite upper and lower surfaces 18 and 20 of the base block 10, said surfaces extending at right angles to the side faces 14, 16 of the block, as is apparent in FIG. 2. The coil 34 of the electromagnetic assemblage 33 is disposed between two sideward extending opposite legs 36a and 38a of the pole plates, the said legs being clear of the base block 10 as illustrated in FIG. 1, for this purpose. The coil has a magnetic core which may comprise a screw 40a of steel or iron, for example.

Preferably, as shown, the pole pieces 36, 38 are secured to the base block by means of brass or other nonmagnetic screws 40 which pass through the plate 38 and the base 10 and are threaded into the pole plate 36. The mounting of the pole plates 36, 38 is such that side portions 36b and 38b of the forwardly extending legs of the pole plates are also clear or free of the base block 10 and extend laterally therefrom an appreciable distance, as may be seen in FIG. 2.

Figure 4:
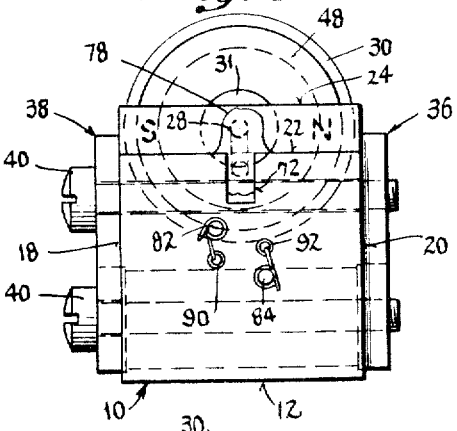
FIG. 4 is a left end elevational view of the indicator device.

For cooperation with the electromagnetic assemblage 33 and coil 34 as thus set forth above, the indicator drum 30 (which may be advantageously fabricated of a lightweight plastic substance and is preferably transparent or translucent) carries a disk-shaped permanent magnet 44 having a polarization along a diameter, such polarization being indicated by the letters "N" and "S" shown in FIGS. 1, 2 and 4. The permanent magnet 44 is located in the immediate field of influence of the poles 36, 38 and may be of an aluminum, nickel and cobalt alloy, as for example that known as Alnico II. Magnetization of the magnet 44 may be advantageously effected after its assembly in the indicator drum 30, so as to orient the poles of the magnet with shoulder stops carried by the drum and which are described below.

Figure 5:
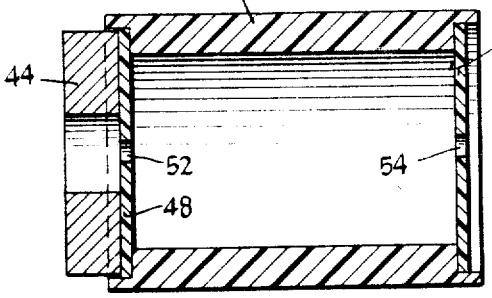
FIG. 5 is an axial sectional view of the rotative assembly comprising the indicator drum of the device.

Referring to FIG. 5, the indicator drum 30 is shown as being cylindrical, with a relatively large bore, the two end edges of the drum being recessed or stepped to accommodate bearing disks 48 and 50 respectively. The bearing disks 48 and 50 have bearing apertures 52 and 54 which are adapted to receive the stationary shaft 28 for the purpose of turnably mounting the drum 30 on the shaft. The permanent magnet 44 is also received in one of the end recesses of the drum 30 as seen in FIG. 5, and preferably the assembling of the drum, bearing disks and magnet is made with a suitable cement by which a secure bond is established between the various components involved, resulting in a strong and sturdy assemblage.

In accordance with the present invention, the bearing disk 50 is constituted in a novel manner by which it functions not only to turnably support the drum 30 on the shaft 28 but also to constitute a stop means in conjunction with a novel cooperable stop means carried by the free end 28a of the shaft, so as to limit rotation of the drum to approximately 75°. Considering FIG. 3 it will be seen that the bearing disk 50 is not completely circular, but instead comprises a major segment of a circle, having a straight edge 56 constituting a chord of the circumference of the disk. The bearing and stop disk 50 as thus constituted is oriented with respect to the polarity of the permanent magnet 44 in a manner indicated in FIG. 3, wherein the poles of the magnet are designated by the letters "N" and "S" shown in reverse or from the back, these letters being seen in front view in FIG. 4.

Flat washers 31 and 32 are provided on the shaft 28 at the ends of the indicator drum 30, as shown in FIGS. 1 and 2, to space the drum from adjoining components and insure free turning movement.

Figure 3:
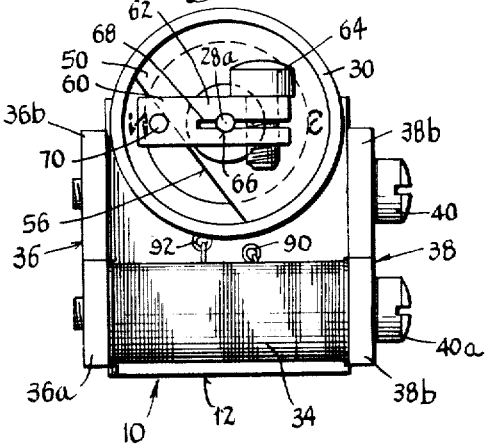
FIG. 3 is a right end elevational view of the indicator device of FIGS. 1 and 2.

The novel and simplified stop means provided by the invention is combined with a simple adjustment device also, said means comprising a stop arm 60 having a slotted portion 62 through which a clamping screw 64 extends. The screw 64 is threaded into one of the parts of the slotted portion 62 as will be understood, and a circular bore 66 passes through the slot 68 of the arm 60 to accommodate the free end 28a of the shaft 28. The stop arm 60 further has a laterally projecting pin or projection 70 which is adapted to extend to the left (as viewed in FIGS. 1 and 2) and into the drum 30, in the space provided between the straight edge 56 of the bearing disk 50 and the adjoining cylindrical wall of the drum. The pin 70 is adapted to be engaged by the straight edge 56 at either of two locations on the edge. Such engagement at one location is illustrated in FIG. 3, and for this position of the indicator drum 30 the north and south permanent magnet poles will be located nearest to the pole plates 36 and 38 as a consequence of the magnetic attraction between the permanent magnet and the said pole plates. The projection 70 and straight edge 56 thus constitute a stop, and the said stop is adjustable by loosening the screw 54 and adjustably setting the stop arm 60 on the shaft 28, as will be understood.

The position of the indicator drum 30 for the unenergized condition of the magnet coil 34 is as shown in FIGS. 1–4. The word "OFF" may be provided on the drum 30 as illustrated, to indicate the unenergized condition of the device or absence of current in the coil 34, corresponding to the "OFF" condition of equipment with which the indicator may be associated (as by connection in the circuit thereof).

The indicator device of the present invention is intended to be energized by direct current, and energization of the coil 34 is effected in such a manner that the pole plate 36 will become a north pole and the pole plate 38 will become a south pole. Thus, for the energized condition of the coil 34 there will exist a repulsive force between the pole plates and the permanent magnet 44. In consequence, the magnet and the drum 30 affixed thereto, in being repelled, will be turned in the only direction possible, namely a clockwise direction as viewed in FIG. 3 or a counterclockwise direction as viewed in FIG. 4. The drum 30 and magnet 44 may turn as much as approximately 75°, whereupon the word "OFF" carried by the drum 30 will be placed in a different location and will be normally not visible. When the drum 30 is in the position of FIGS. 1–4, the word "OFF" may, for example, be positioned so as to be visible through a viewing window or the like. Thus, the indicator drum 30 will have either of two positions, depending on whether the coil 34 is energized or de-energized, and adjustment of the said positions within limits is possible by adjustably shifting the stop arm 60, as will be now understood.

By the present invention a unique and simple mounting for the shaft 28 is provided, by which it is fixedly attached to the base block 10. Referring to FIGS. 1, 2 and 4, a notch 72 is provided in the shoulder 22, the said notch having a sloping bottom wall 74 which is hereinafter referred to as an "offset shoulder." Accommodated in the notch 72 and engaged with the bottom surface or offset shoulder surface 74 thereof is an angularly bent portion 28b of the shaft 28, the said portion being also hereinafter referred to as an "offset" portion. The bearing block has a through opening 76 disposed in its front portion, through which the shaft 28 extends. Thus, the shaft 28 is securely located on the base block 10, being accurately positioned with respect to the pole plates 36, 38 and coil 34 constituting the electromagnetic assemblage. A suitable cement, such as indicated at 78 is applied to the angularly offset end 28b of the shaft 28 and to the upper portion of the base block 10, to securely affix the shaft 28 to the block.

As provided by the invention, for the purpose of conveniently mounting the indicator unit for easy removal and in order to bring current to the coil 34, two contact pins 82 and 84 are secured to the base 10, and the two end wires 86 and 88 from the coil 34 are brought through openings 90 and 92 in the base block and wrapped around the contact pins 82, 84. Soft solder is utilized to connect the wires 86, 88 to the pins 82, 84, whereby good electrical connection is insured.

It will be noted that, as provided by the above construction, the heavier rotative component comprising the Alnico magnet 44 is closely juxtaposed to the supporting portion of the base block 10, and is located remote from the free end 28a of the shaft 28. The stop arm 60 and the clamping screw 64 thereof, together with the stop pin or projection 70 may be constituted of light metal such as aluminum, or else of suitable plastic substance whereby these components represent but little weight. This construction, in conjunction with the lightweight drum 30 formed of plastic substance, enables the indicator device to readily withstand adverse operating conditions such as rough handling, shock and vibration when put into operation, and minimizes lateral deflection of the shaft by the magnet.

Figure 6:
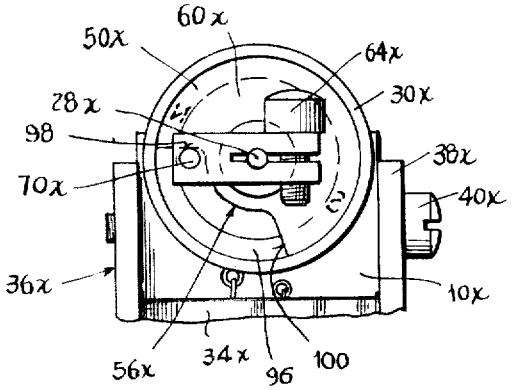
FIG. 6 is a fragmentary right end elevational view of the indicator device, illustrating a modification of the invention.

Another embodiment of the invention is illustrated in FIG. 6. This embodiment differs from that of FIGS. 1–5 in that there is provided a simple and effective "flip-flop" means for retaining the movable member in either of two indicating positions, an "off" position and an "on" position. The said means utilizes the same type and shape of permanent magnet disk which is described above as the component 44. However, the embodiment of FIG. 6 differs from that of FIGS. 1–5, in the provision of a different kind of stop disk which is cooperable with the adjustable stop arm, whereby the indicator drum is able to have a greater arc of movement, as for example an arc of 150°.

As shown in FIG. 6, there is a base block 10x to which are affixed pole plates 36x and 38x, as by means of a screw 40x. Carried by the base block 10x is a shaft having an end 28x, on which there is mounted a stop arm 60x secured in adjusted position by a draft screw 64x. The stop arm 60x carries a stop pin 70x which is cooperable with a stop disk 50x shaped to present an arcuate notch or clearance space 96 defined by a curved edge 56x. Also bounding the arcuate notch or space 96 are end edges 98 and 100, the edge 98 being shown in engagement with the stop pin 70x. For this position, the permanent magnet poles "N" and "S" are in the positions shown wherein the magnetic attraction of such poles for the pole plates 36x and 38x maintains the indicator drum 30x in position displaying the word "off" at the top, as seen in FIG. 6.

If the indicator device of FIG. 6 is energized by direct current in one direction or sense, that is, so energized by a direct current or unidirectional pulse that the pole plate 36x becomes a north pole and the pole plate 38x becomes a south pole, the indicator drum 30x and the permanent magnet attached thereto will be shifted or turned in a clockwise direction as seen in the figure, until the stop edge 100 is brought in engagement with the pin 70x. This is due to the magnetic repulsion existing between the adjoining magnetic poles, and magnetic attraction between the remote poles. For such new position of the indicator drum 30x, the north pole of the permanent magnet disk will now be located close to the pole plate 38x, and the south pole of the disk will be located close to the pole plate 36x. The permanent magnet disk and the indicator drum 30x will continue to occupy this new position even though the energization of the device is discontinued, since there will still exist a fairly strong attraction between the permanent magnet poles and the depolarized plates 36x and 38x. The word "on" may be provided on the indicator drum 30x to be visible at the top of said drum for the new position of the same, considering a view such as that of FIG. 6.

It will be understood that, by the provision of the larger path of travel for the indicator drum 30x, it will stay in either of the two positions in which it might be placed, such placement being either by the exertion of a manual force or else by the application of a suitable direct current or pulse to the energizable coil.

If, now it is desired to restore the drum 30x to the "off" position, this may be readily accomplished by a reversal of a current or pulse in the energizable coil, energizing the coil in the opposite sense whereby the pole plate 38x is made a north pole and the pole plate 36x is made a south pole.

From the foregoing it is seen that the indicator device not only has magnetic detent means which retains yieldably the indicator drum 30x in either of the two possible positions thereof but also that the said drum may be readily shifted from one position to the other, by merely effecting a reversal of the energizing current in the coil, to reverse the polarity of the pole plates 36x and 38x. The said magnetic means thus serves as a simple and dependable detent which is devoid of moving parts, as well as functioning to provide the motive force in shifting the drum.

Figure 7:
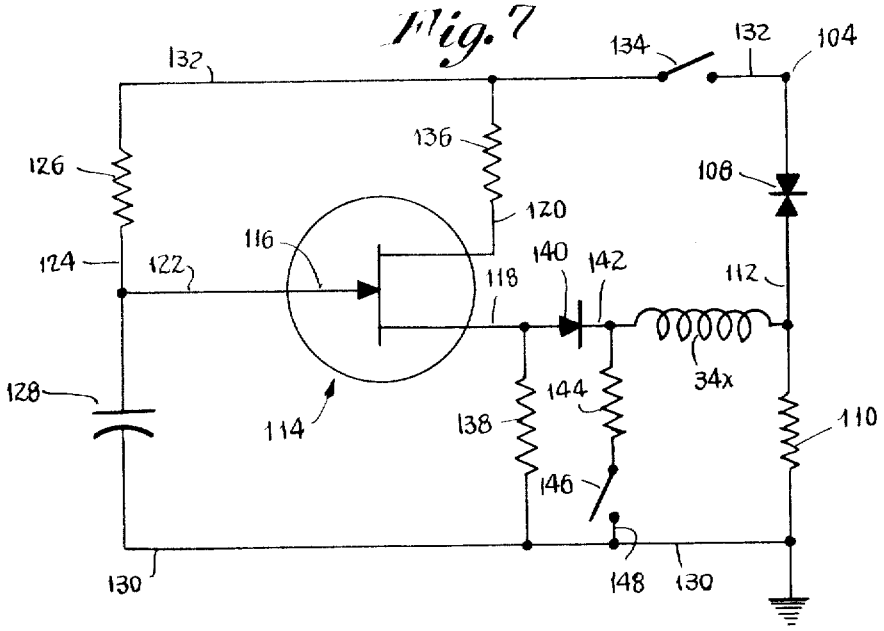
FIG. 7 is a schematic circuit diagram of the time delay circuit associated with the indicator device or unit.

In accordance with the present invention there is provided a simple and unique time delay circuit by which actuation of the indicator device described above and illustrated in FIG. 6 may be readily effected after the elapse of a predetermined interval of time from the commencement of a particular condition, as for example the closing of an electrical switch. The time delay circuit is illustrated in FIG. 7, and comprises relatively few components, these being especially small and rugged in construction whereby the circuitry is compact and requires but little space while at the same time being resistant to vibration, shock, etc.

Referring to the figure, terminals 104 and 106 are provided for connection to a suitable source of energy having a potential, for example, of from 36 to 48 volts D.C. Connected between the terminals 104 and 106 and in series with each other are a 24 volt Zener diode 108 and a resistor 110. These two components are joined by a wire 112.

The circuit further utilizes a double base diode or uni-junction transistor 114 having an emitter 116, a number 1 base connection 118 and a number 2 base connection 120. The emitter 116 is connected by a wire 122 to the joining wire 124 between a resistor 126 and a capacitor 128, the latter having the polarity indicated. The capacitor 128 is connected by a wire 130 to the terminal 106, and the resistor 126 is connected by a wire 132 through a control switch 134 to the terminal 104. The base number 2 connection 120 is joined to a resistor 136 which is in turn connected with the wire 132. The base number 1 connection which is labelled 118 is connected through a resistor 138 to the wire 130. The base connection 118 is also connected to a diode 140 which is in turn connected to one end of the energizable coil 34x of the unit shown in FIG. 6. The remaining end of the coil 34x is connected by a wire 142 to the wire 112. A resistor 144 is connected with the wire 142 and with a reset switch 146 which is in turn connected by a wire 148 to the wire 130. This completes the time delay current as utilized with the indicator unit of FIG. 6.

In the above circuit, the components may have the following values: The resistor 136 may be 470 ohms, the resistor 126 may be 10,000 ohms, the resistor 138 may be 6,800 ohms, the resistor 144 may be 18 ohms, and the resistor 110 may be 1,000 ohms. The coil 34x may have a resistance of 800 ohms, and the capacitor 128 may have a value of 22 microfarads. The uni-junction transistor may be of the kind commercially available under the number 2N491, and the Zener diode 108 may be type 1N1881.

The control switch 134 may be associated with an instrumentality and caused to close in response to the attainment of a certain temperature by the said instrumentality. With the circuit shown, a delay of approximately 3 seconds is introduced between the moment of closing of the control switch 134 and the energization of the indicator coil 34x to an extent sufficient to shift the drum 30x from the "off" position shown in FIG. 6 to the "on" position described.

Operation of the circuit of FIG. 7 is briefly as follows: With the control switch 134 in the open position as shown, the existence of the indicated voltage between the terminals 104 and 106 will not result in any appreciable current flow for the reason that insufficient voltage will be applied between the opposite terminals of the Zener diode 108 to break down the same or cause it to become conductive. The presence of the high value resistors 110 and 138 will not provide sufficient conductivity to attain a break down of the Zener diode 108, as will be understood. And, of course, no appreciable current path will be provided through the capacitor 128 for this purpose. The drum 30x will be displaying the word "off."

If now the switch 134 should be closed, a charging of the capacitor 128 through the resistor 126 will occur. Due to the relatively high value of the resistor 126, there will be required a certain interval of time until the capacitor 128 attains a charge sufficient to cause the transistor 114 to become conductive or operative. After the said elapse of time, whereupon the potential difference between the terminals of the capacitor 128 attains a value sufficient to cause the transistor 114 to become operative, a low resistance path will be established through said transistor between the emitter 122 connection and the connection 118 to the base number 1. The condenser 128 will now discharge through the said low resistance path, the discharge current passing through the diode 140 and through the coil 34x and resistor 110. Energization of the coil 34x will effect a north polarity at the pole plate 36x, and a south polarity at the pole plate 38x. The resultant repulsion and attraction between the said pole plates on the one hand and the permanent magnet poles of the indicator drum 30x on the other hand will shift the indicator drum from the "off" position shown to the "on" position, wherein the drum will now remain even when the pulse or current ceases. The discharge from the capacitor 128 will be in the nature of a pulse. However, the said pulse will provide sufficient current to effect the operation of the indicator as just set forth.

With the switch 134 remaining closed, the said pulse or charging and discharging cycle will be repeated, the capacitor 128 periodically charging and thereafter discharging through the transistor 114, diode 140 nnd indicator coil 34x. However, all subsequent pulses from the capacitor 128 will have no motivating effect on the indicator drum 30x once the drum has been shifted from the "off" position to the "on" position. Also, if at any time the switch 134 will be opened, this will not restore the indicator drum 30x to the "off" position, since such restoration requires an opposite energization of the indicator coil 34x. In effecting the reset of the indicator, the switch 134 is now placed in the open position, as shown in FIG. 7.

In accordance with the invention, such opposite energization is effected in a simple and unique manner by the provision of the illustrated circuit, being accomplished by merely closing the reset switch 146. When such switch is closed after the indicator has been shifted from the "off" to the "on" position, the following action will take place: The relatively small resistance of the resistor 144 and coil 34x now functioning in parallel with the resistor 110, will result in the application of a voltage to the Zener diode 108 in excess of the breakdown voltage thereof. In consequence, the Zener diode 108 will become conducting, and current will flow through the same and through the coil 34x in a direction opposite to that which flowed previously as a consequence of discharge of the capacitor 128. Such opposite current flowing through the coil 34x will effect an opposite polarity of the pole plates 36x and 38x, as compared with the polarity produced in consequence of discharging of the capacitor 128. Therefore, the resultant magnetic repulsion and retraction will now restore or shift the indicator drum 30x in a counterclockwise direction, to the position illustrated in FIG. 6. When this has occurred, the reset switch 146 is again placed in the open position as shown, and the device is in readiness for providing a new indication approximately three seconds after the control switch 134 is closed.

It will be noted from the foregoing that I have provided a novel combination of time delay circuit and flip-flop type indicator device which has a number of distinct advantages. The combination involves relatively few components and may be made extremely small and compact whereby it requires but little space. The individual components are of rugged construction and well adapted to withstand rough usage, vibration, shock, etc. But a single movable part is involved, comprising the indicator drum and permanent magnet assemblage, whereby there is little in the way of mechanical movements to get out of order. The functioning of the various diodes, transistor, resistors and capacitor is reliable at all times, so that failure is unlikely and servicing held to a minimum.

Variations and modifications may be made within the scope of the claims, and portions of the improvement may be used without others.

I claim:

1. A compact, shock-resistant, electric current-responsive indicator device for connection to a D.C. circuit to indicate conditions of energization and deenergization thereof comprising, in combination:

(a) a right-angled base block of insulating material, said block having an opening at one side thereof, (b) a stationary shaft carried at solely one end by the base block, said shaft being disposed in the opening of the block and projecting from the said side thereof to have a free end, (c) an indicator drum having indicia, said drum being turnably carried by the shaft, one end of the drum being adjacent the said side of the base block, (d) a permanent magnet affixed to the drum at the said one end thereof, to turn therewith, said magnet being closely adjacent the portion of the block which supports the shaft and being remote from the free end of the shaft, thereby to minimize lateral deflection of the shaft by the magnet, (e) an electromagnet having poles of magnetic material, said electromagnet being carried by the base block with at least one pole portion located in the immediate field of influence of the permanent magnet, the magnetic attraction by the latter tending to hold the drum in an "off" deenergization-indicating position when the electromagnetic is unenergized, and D.C. energization of the electromagnet in one sense effecting a repulsion of the permanent magnet and shifting of the same and the drum to another and "on" rotative position indicating energization of the electromagnet, (f) the poles of the electromagnet comprising L-shaped plates disposed respectively against opposite parallel sides of the base block locates at right angles to the said other side of the block, (g) said pole plates having pairs of opposite legs, one pair of legs being extended clear of the block and the other pair engaging the block along their lengths, one leg of said other pair constituting the said pole portion located in the field of the permanent magnet, (h) said electromagnet including a coil disposed between and magnetizing the said one pair of legs of the pole plates, said coil being disposed broadside to the indicator drum.

2. A device as in claim 1, wherein:

(a) the pole plates are flat;

(b) portions of the said other pair of legs extending clear of the block and toward the drum, (c) said permanent magnet being disposed between the said portions of the other pair of legs to coact therewith.

3. A device as in claim 2, wherein:

(a) a stop arm is provided, said arm being frictionally mounted on the free end of the shaft and shiftable about the latter, (b) a screw-controlled clamp is provided on the arm for securing the same in different adjusted rotative positions on the shaft, (c) said stop arm having a projection extending into the drum, (d) said drum having stop shoulders for engagement with the projection on the stop arm to limit turning of the drum and of the permanent magnet to a range having as limits the said "on" and "off" positions.

4. A device as in claim 3, wherein:

(a) there is a combined bearing and stop plate affixed to the drum and having the said stop shoulders, said plate both supporting the drum for turning on the shaft and constituting a stop for the drum.

*5. A compact, shock-resistant, electric current-responsive indicator device for connection to a D.C. circuit to indicate conditions of energization and deenergization thereof comprising, in combination:*

*(a) a right-angled base block of insulating material, said block having an opening at one side thereof,*

*(b) a stationary shaft carried at solely one end by the base block, said shaft being disposed in the opening of the block, and projecting from the said side thereof to have a free end,*

*(c) an indicator drum having indicia, said drum being turnably carried by the shaft, one end of the drum being adjacent the said side of the base block,*

*(d) a permanent magnet affixed to the drum at the said one end thereof, to turn therewith, said magnet being closely adjacent the portion of the block which supports the shaft and being remote from the free end of the shaft, thereby to minimize lateral deflection of the shaft by the magnet,*

*(e) an electromagnet having poles of magnetic material, said electromagnet being carried by the base block with at least one pole portion located in the immediate field of influence of the permanent magnet, the magnetic attraction by the latter tending to hold the drum in an "off," deenergization-indicating position when the electromagnet is unenergized, and D.C. energization of the electromagnet in one sense effecting a repulsion of the permanent magnet and shifting of the same and the drum to another and "on" rotative position indicating energization of the electromagnet,*

*(f) the poles of the electromagnet comprising plates disposed respectively against opposite parallel sides of the base block located at right angles to the said other side of the block,*

*(g) said pole plates having first portions extended clear of the block and second portions engaging the block along their lengths, one of said second portions constituting the said pole portion located in the field of the permanent magnet,*

*(h) said electromagnet including a coil disposed between and magnetizing the said first portions of the pole plates, said coil being disposed broadside to the indicator drum.*

*6. A device as in claim 5, wherein:*

*(a) the pole plates are flat;*

*(b) said first portions extending alongside part of the drum,*

*(c) said permanent magnet being disposed between the said second portions of the plates to coact therewith.*

References Cited

The following references, cited by the Examiner, are of record in the patented file of this patent or the original patent.

UNITED STATES PATENTS

| | | | |
|---|---|---|---|
| 988,004 | 3/1911 | Lungen | 340—376 |
| 2,367,299 | 1/1945 | McLaren et al. | 343—373 |
| 2,740,955 | 4/1956 | Barrett | 340—373 |
| 2,912,685 | 1/1959 | Thomas | 340—377 |
| 2,924,817 | 2/1960 | Dawkins et al. | 340—377 |
| 3,036,630 | 5/1962 | Knight | 340—377 |
| 3,074,060 | 1/1963 | Kadec | 340—373 |
| 3,089,131 | 5/1963 | Morgan | 340—319 |

JOHN W. CALDWELL, *Primary Examiner.*

A. J. KASPER, *Assistant Examiner.*